United States Patent
Nelson et al.

(10) Patent No.: US 12,456,125 B2
(45) Date of Patent: Oct. 28, 2025

(54) VERIFYING A FIELD REPLACEABLE UNIT BEFORE REPLACEMENT

(71) Applicant: Dell Products L.P., Round Rock, TX (US)

(72) Inventors: Amy Christine Nelson, Round Rock, TX (US); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 472 days.

(21) Appl. No.: 18/055,520

(22) Filed: Nov. 15, 2022

(65) Prior Publication Data

US 2024/0161122 A1     May 16, 2024

(51) Int. Cl.
  *G06Q 30/016*    (2023.01)
  *G06Q 10/20*     (2023.01)
  *G06Q 30/012*    (2023.01)

(52) U.S. Cl.
  CPC .......... *G06Q 30/016* (2013.01); *G06Q 10/20* (2013.01); *G06Q 30/012* (2013.01)

(58) Field of Classification Search
  None
  See application file for complete search history.

(56) References Cited

U.S. PATENT DOCUMENTS

| | | | | |
|---|---|---|---|---|
| 8,661,254 B1 * | 2/2014 | Sama | ................ | H04L 63/18 |
| | | | | 713/168 |
| 9,629,928 B1 * | 4/2017 | Olsen | ................ | A61K 48/00 |
| 2004/0078634 A1 * | 4/2004 | Gilstrap | ................ | G06Q 10/06 |
| | | | | 714/47.3 |
| 2008/0126886 A1 * | 5/2008 | Elliott | ................ | G06Q 10/06 |
| | | | | 714/57 |
| 2009/0037199 A1 * | 2/2009 | Testardi | ............ | G03G 15/5075 |
| | | | | 705/302 |

(Continued)

OTHER PUBLICATIONS

Warranty Management Solution for QR codes [online], available at: <https://web.archive.org/web/20211201234915/https://www.neurotags.com/warranty-management-solution> archived on Dec. 1, 2021. (Year: 2021).*

(Continued)

*Primary Examiner* — Richard W. Crandall
(74) *Attorney, Agent, or Firm* — Kirton McConkie; Brian Tucker

(57) ABSTRACT

A field replaceable unit can be verified before replacement. An integrity plugin on a customer device can be configured to compute a hash of each field replaceable unit on the customer device. The integrity plugin can share these hashes with an integrity service which can use the hashes to generate an integrity status of the field replaceable units. The integrity service can maintain the integrity status of the field replaceable units in an integrity database. When the customer requests replacement of a field replaceable unit, a technician device can interface with the integrity plugin to obtain a computed hash of the field replaceable unit. The integrity status for the field replaceable unit can then be used to evaluate the computed hash to thereby verify the integrity of the field replaceable unit. If the verification fails, the technician can forego replacing the field replaceable unit under a support or warranty plan.

11 Claims, 14 Drawing Sheets

(56) References Cited

U.S. PATENT DOCUMENTS

2011/0016008 A1* 1/2011 Maraz ................. G06Q 20/202
                                                     705/302
2020/0034237 A1* 1/2020 Suryanarayand ..... G06F 11/073

OTHER PUBLICATIONS

Mount, Dave, CMSC 320: Lecture 10: Hashing—Basic Concepts and Hash Functions, available at :< https://www.cs.umd.edu/class/fall2019/cmsc420-0201/Lects/lect10-hash-basics.pdf > date: Fall 2019. (Year: 2019).*

Dell OpenManage SNMP Reference Guide, [online], published 2014, available at: < https://dl.dell.com/topicspdf/dell-opnmang-srvr-admin-v8.0.1_help_en-us.pdf > (Year: 2014).*

* cited by examiner

VERIFYING A FIELD REPLACEABLE UNIT BEFORE REPLACEMENT

CROSS-REFERENCE TO RELATED APPLICATIONS

N/A

BACKGROUND

Original equipment manufacturers (OEMs) such as Dell, HP, Lenovo, etc. oftentimes provide support plans or warranties that cover hardware part replacement including field replaceable units (i.e., hardware parts that can be replaced at the customer's location) of customers' devices (e.g., desktops, laptops, etc.). In such cases, if a field replaceable unit (e.g., a fan, storage drive, memory module, etc.) on a customer's device malfunctions, the customer can request replacement of the malfunctioning field replaceable unit.

In some cases, the OEM may ship a new field replaceable unit to the customer to allow the customer to perform the replacement. In other cases, the OEM may send a technician to the customer's premises to perform the replacement. In any case, a faulty field replaceable unit can typically be verified only after it has been replaced such as when the faulty field replaceable unit is returned to the OEM, whether by the customer or the technician. Because of this, customers can submit false claims for replacement of a field replaceable unit.

For example, a customer could replace the original field replaceable unit that would be covered by a support plan or warranty with a field replaceable unit that should not be covered, whether innocently or dishonestly, and then request replacement, whether directly or as a result of reporting crashes or errors. In such a case, the OEM may replace the field replaceable unit that should not be covered because it has no way of verifying the field replaceable unit until after it is returned.

BRIEF SUMMARY

The present invention extends to systems, methods and computer program products for verifying a field replaceable unit before replacement. An integrity plugin on a customer device can be configured to compute a hash of each field replaceable unit on the customer device. The integrity plugin can share these hashes with an integrity service which can use the hashes to generate an integrity status of the field replaceable units. The integrity service can maintain the integrity status of the field replaceable units in an integrity database. When the customer requests replacement of a field replaceable unit, a technician device can interface with the integrity plugin to obtain a computed hash of the field replaceable unit. The integrity status for the field replaceable unit can then be used to evaluate the computed hash to thereby verify the integrity of the field replaceable unit. If the verification fails, the technician can forego replacing the field replaceable unit under a support or warranty plan.

In some embodiments, the present invention may be implemented as a method for verifying a field replaceable unit before replacement. A hash of a field replaceable unit can be calculated at a customer device. A scannable code can be generated from the hash of the field replaceable unit. The scannable code can be displayed on the customer device. In response to a technician scanning the scannable code on the customer device, a field replaceable unit integrity request can be sent to an integrity service. The field replaceable unit integrity request can include the hash of the field replaceable unit. In response to receiving the field replaceable unit integrity request, an integrity status of the field replaceable unit can be determined.

In some embodiments, the present invention may be implemented as computer storage media storing computer executable instructions which when executed implement a method for verifying a field replaceable unit before replacement. A scannable code that includes a hash calculated for a field replaceable unit installed on a customer device can be displayed on the customer device. In response to the scannable code being scanned, the hash calculated for the field replaceable unit can be sent to an integrity service. The hash calculated for the field replaceable unit can be compared to one or more known hashes associated with the customer device. When the hash calculated for the field replaceable unit matches the one or more known hashes associated with the customer device, a technician can be notified to replace the field replaceable unit.

In some embodiments, the present invention may be implemented as a system that includes a customer device having field replaceable units and an agent that includes an agent user interface and an integrity plugin, and a management solution that includes an integrity service and an integrity database. The integrity plugin can be configured to calculate hashes for the field replaceable units and to present scannable codes for the calculated hashes. The integrity service can be configured to receive the calculated hashes and compare the calculated hashes to known hashes for field replaceable units associated with the customer device and to provide integrity status based on the comparison.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
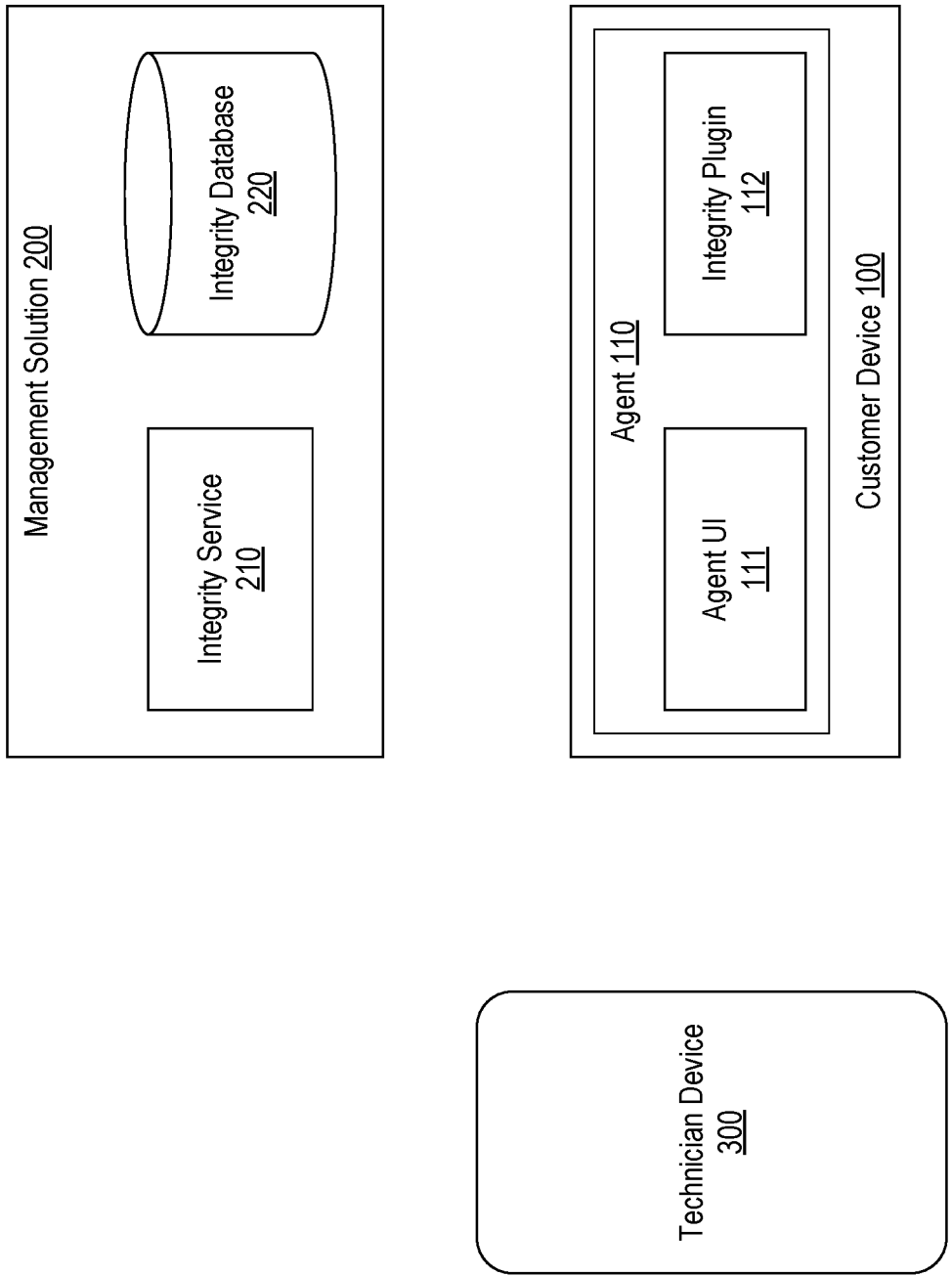
FIG. 1A provides an example of a computing environment in which embodiments of the present invention may be implemented.

FIG. 1A provides an example of a computing environment in which embodiments of the present invention may be implemented. This computing environment includes a customer device 100, a management solution 200, and a technician device 300. In a typical implementation, customer device 100 can represent an OEM's computing device, management solution 200 can represent the same OEM's management solution, and technician device 300 can represent a mobile computing device of a technician employed by or otherwise working for this same OEM. However, embodiments of the present invention could be implemented when different OEMs and/or third parties are involved. For example, one OEM or a third party could implement management solution 200 and customer device 100 could be any other OEM's computing device. In short, embodiments of the present invention could be provided to allow any provider of support or warranty services to verify a field replaceable unit before replacement. Additionally, in typical implementations, there would be many customer devices 100 and many technician devices 300.

Customer device 100 can represent any computing device that includes one or more field replaceable units. For example, customer device 100 could be a server, a desktop, a laptop, a thin client, a smart phone, another smart device, etc. Customer device 100 can include an agent 110 that includes an agent user interface 111 and an integrity plugin 112. Although not shown, agent 110 could also include a device management component (e.g., to allow customer device 100 to be managed by an administrator), a trusted device component (e.g., to allow a trust score for customer device 100 to be calculated for management purposes), and/or other components.

Management solution 200 can represent any arrangement of server computing components. For example, management solution 200 could be implemented in a public or private cloud or on a standalone server computing device. Management solution 200 can include an integrity service 210 and an integrity database 220. Although not shown, management solution 200 can include or be integrated with various other components such as an IT support system (e.g., support.dell.com), a management system (e.g., OneIT, TechDirect, Microsoft Endpoint Configuration Manager, etc.), and/or other end point management or backend services.

Technician device 300 can represent a computing device used by a technician to verify a field replaceable unit of customer device 100. As described in detail below, in some cases, a technician could be located remotely from customer device 100 (e.g., the technician could be a support agent that handles a customer's support or warranty requests) and could determine that a replacement field replaceable unit should be sent to the customer, while in other cases, a technician could visit the customer's premises to perform the replacement. In cases where the technician visits the customer's premises, technician device 300 would typically be a mobile computing device such as a tablet or smart phone and may include a mobile or web application for performing the functionality described herein.

As an overview, integrity plugin 112 can be configured to compute a hash of each field replaceable unit on customer device 100. Integrity plugin 112 can share these hashes with integrity service 210 which can use the hashes to generate an integrity status of the field replaceable units. Integrity service 210 can maintain the integrity status of the field replaceable units in integrity database 220. When the customer requests replacement of a field replaceable unit, technician device 300 can interface with integrity plugin 112, such as via integrity service 210 or agent user interface 111, to obtain a computed hash of the field replaceable unit. The integrity status for the field replaceable unit can then be used to evaluate the computed hash to thereby verify the integrity of the field replaceable unit. If the verification fails, the technician can forego replacing the field replaceable unit under a support or warranty plan.

Figure 1B:
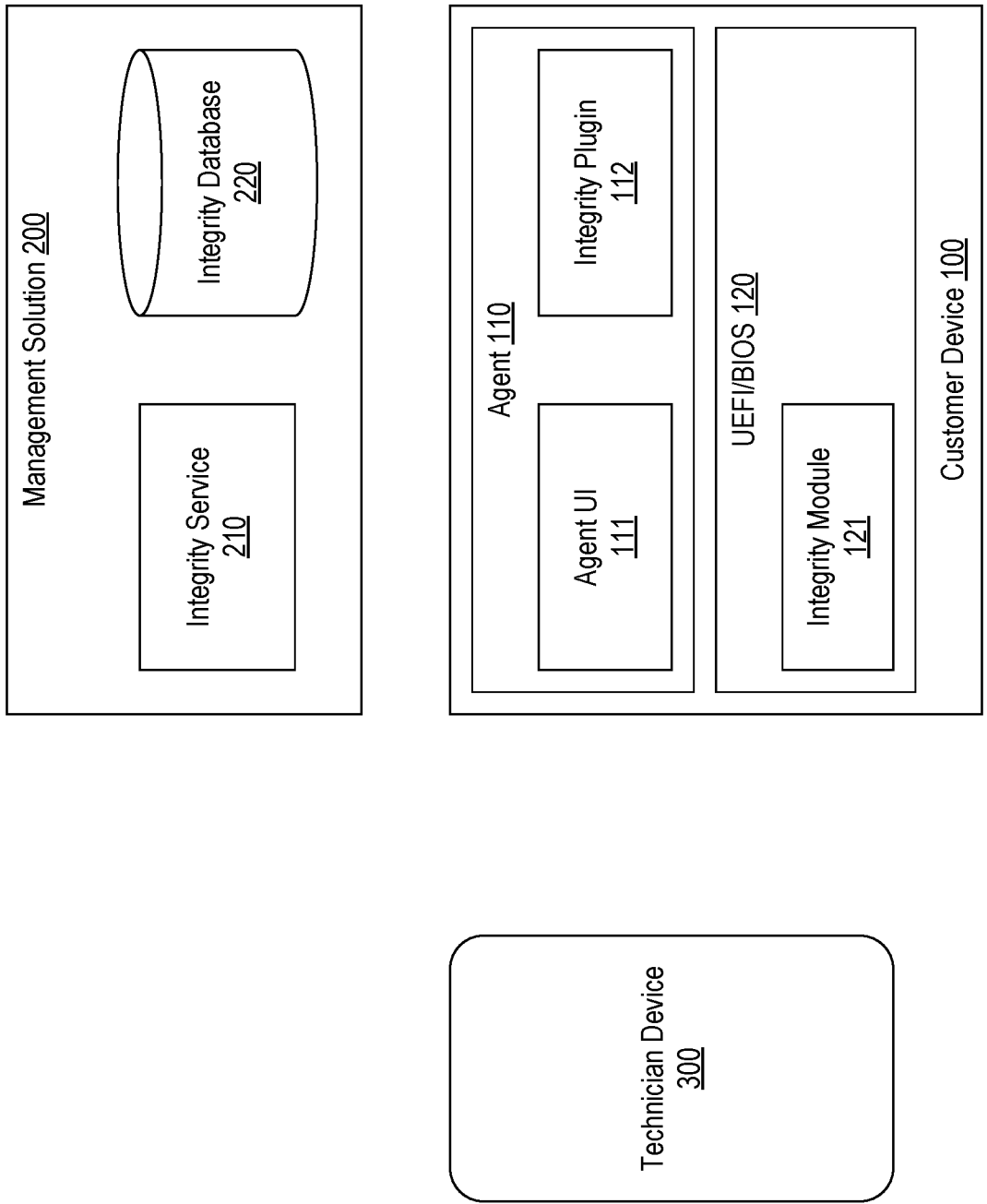
FIG. 1B provides another example of a computing environment in which embodiments of the present invention may be implemented.

FIG. 1B provides another example of a computing environment in which embodiments of the present invention may be implemented. This computing environment is the same as in FIG. 1A except that customer device 100 includes an integrity module 121 that is part of UEFI/BIOS 120 and that can function in a similar manner as agent user interface 111 and integrity plugin 112 such as when customer device 100 is unable to boot.

Figure 2A:
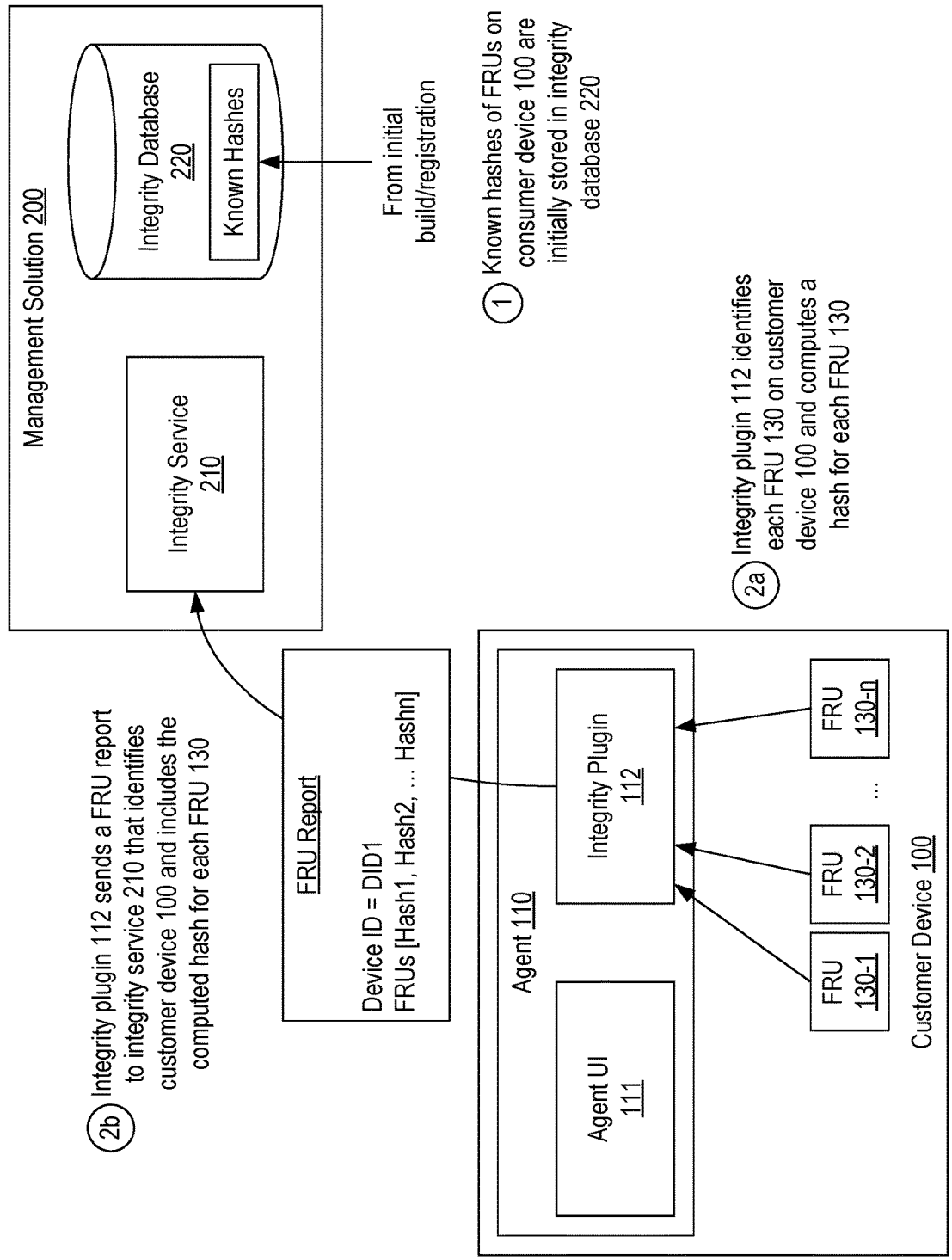
FIGS. 2A-2C provide an example of how an integrity status report may be generated for a customer device in accordance with one or more embodiments of the present invention.
Figure 2B:
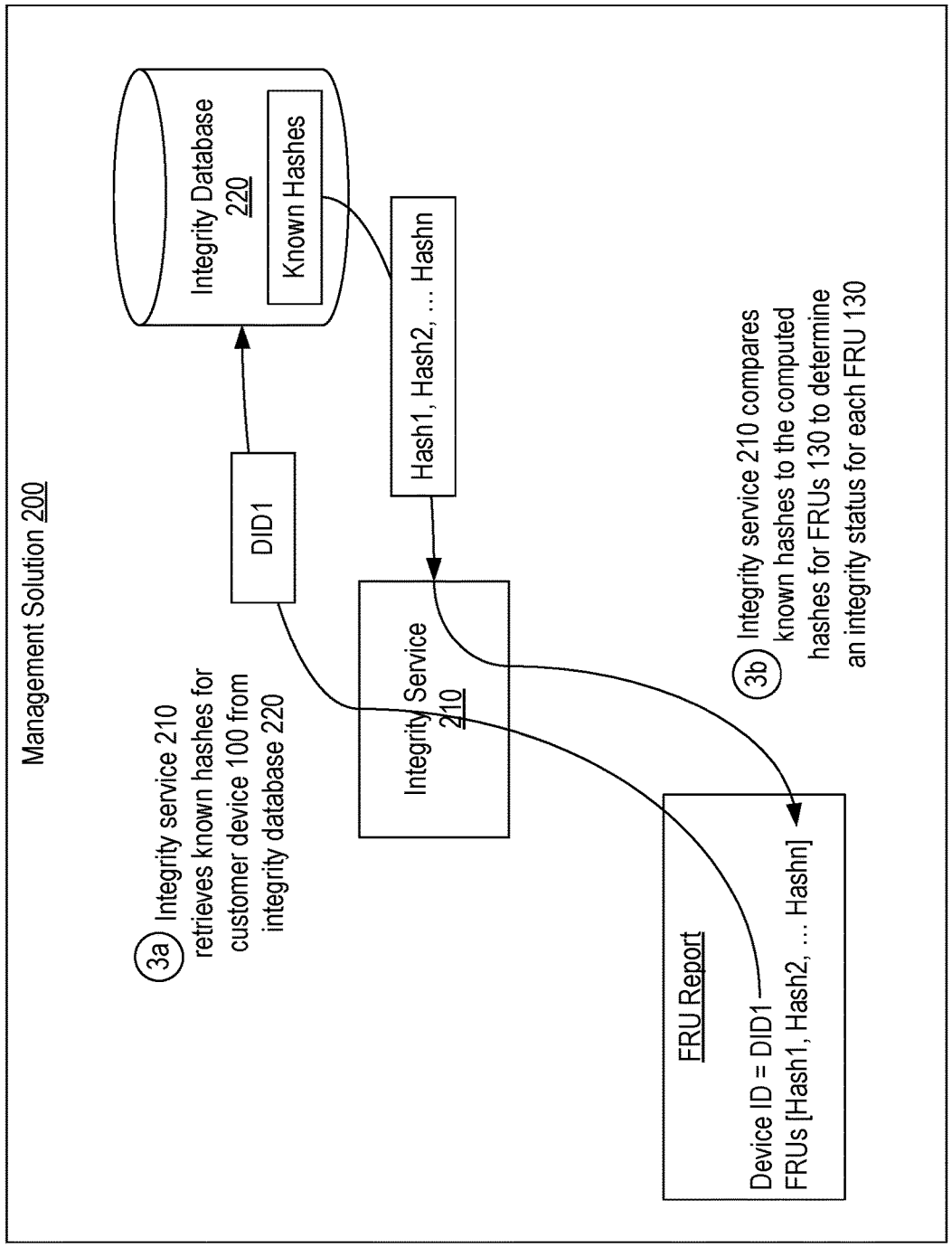
Figure 2C:
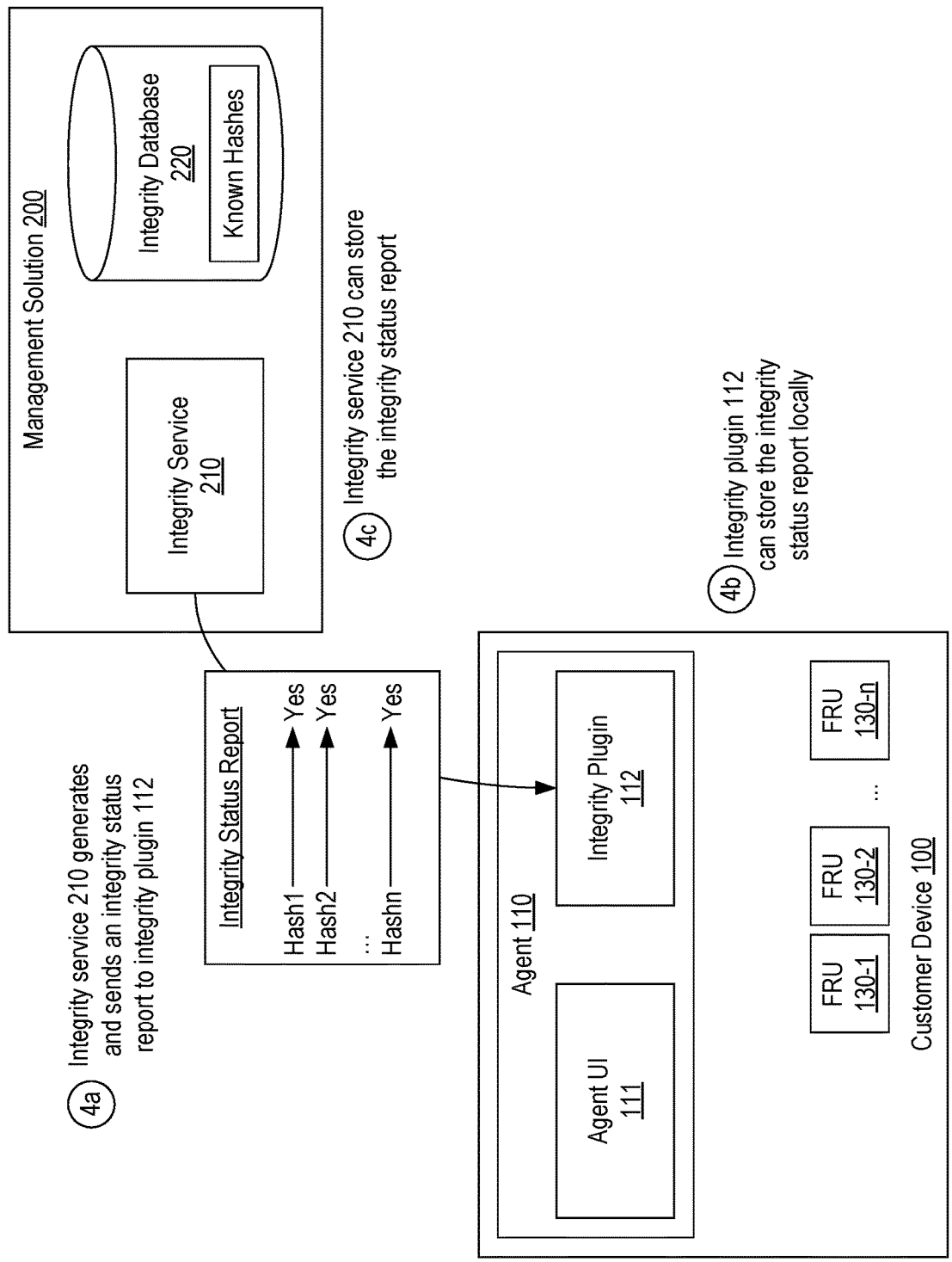

FIGS. 2A-2C provide an example of functionality that may be performed to create an integrity status report for customer device 100. In this example, customer device 100 is assumed to have a number of field replaceable units 130-1 through 130-$n$ (generally and collectively field replaceable unit(s) 130).

Turning to FIG. 2A, in step 1, known hashes of the field replaceable units on customer device 100 can initially be stored in integrity database 220. For example, when the OEM initially builds customer device 100 and/or when customer device 100 is initially registered with management solution 200, hashes of each field replaceable unit included on customer device 100 can be calculated and stored in integrity database 220 in association with an identifier of customer device 100. Accordingly, step 1 can represent any actions by which hashes of field replaceable units that are to be covered by a support or warranty plan are obtained and stored for later use. A hash for a field replaceable unit could be calculated in any suitable way. For example, a hash could be computed from a serial number or other identifier of the field replaceable unit. In some embodiments, the hash can be associated with the type of the field replaceable unit in addition to being associated with an identifier of the customer device on which the field replaceable unit is installed. For example, if the field replaceable unit is a fan, the known hash could be stored with an identifier of "fan" and an identifier of the customer device.

In step 2$a$, which may be performed at a subsequent time such as when customer device 100 is first booted by the customer, when a new FRU is installed, and/or periodically, integrity plugin 112 can identify each field replaceable unit 130 that is currently present on customer device 100 and can compute a hash for each field replaceable unit 130. In step 2$b$, integrity plugin 112 can send a field replaceable unit report to integrity service 210. This field replaceable unit report can identify customer device 100 (e.g., by providing a device ID which is assumed to be DID1) and can include the computed hash for each field replaceable unit 130 (e.g., Hash1 for FRU 130-1, Hash2 for FRU 130-2, . . . Hash$n$ for FRU 130-$n$). Also, as suggested above, in some embodiments, each computed hash could be associated with the type of the field replaceable unit.

Turning to FIG. 2B, in step 3$a$ and in response to receiving the field replaceable unit report, integrity service 210 can access integrity database 220 to retrieve the known hashes for customer device 100. For example, integrity service 210 could extract the device ID (DID1) from the field replaceable unit report and use it to query integrity database 220 for known hashes of field replaceable units that are associated with the device ID. Then, in step 3$b$, integrity service 210 can compare the known hashes to the computed hashes for field replaceable units 130 that are defined in the field replaceable unit report to thereby determine an integrity status for each field replaceable unit 130. In this example, it is assumed that field replaceable units 130 represent the original field replaceable units that were included with customer device 100 and therefore the computed hashes will match the known hashes. However, if field replaceable units 130 includes a replacement the customer had made (as opposed to the OEM), the computed hash would not match any known hash.

Turning to FIG. 2C, in step 4a, integrity service 210 can generate and send an integrity status report to integrity plugin 112. This integrity status report can provide an integrity status for each of field replaceable units 130. For example, the integrity status report could associate each computed hash with an integrity status (e.g., Yes or No) defining whether the computed hash matched a known hash associated with customer device 100. Because field replaceable units 130 are assumed to match the original field replaceable units, in this example integrity status report identifies an integrity status of "Yes" for each field replaceable unit 130. In step 4b, integrity plugin 112 may optionally store this integrity status report locally on customer device 100. Similarly, in step 4c, integrity service 210 may optionally store the integrity status report. In some embodiments, integrity plugin 112 and/or integrity service 210 could use the integrity status report to verify a field replaceable unit 130 before replacement. For example, the integrity status report could be signed or otherwise secured to ensure that it remains unchanged and can be used to represent the known state of field replaceable units on customer device 100.

FIGS. 3A-3F provide an example of how a field replaceable unit can be verified before replacement in accordance with embodiments of the present invention. This example will continue the example of FIGS. 2A-2C.

Figure 3A:
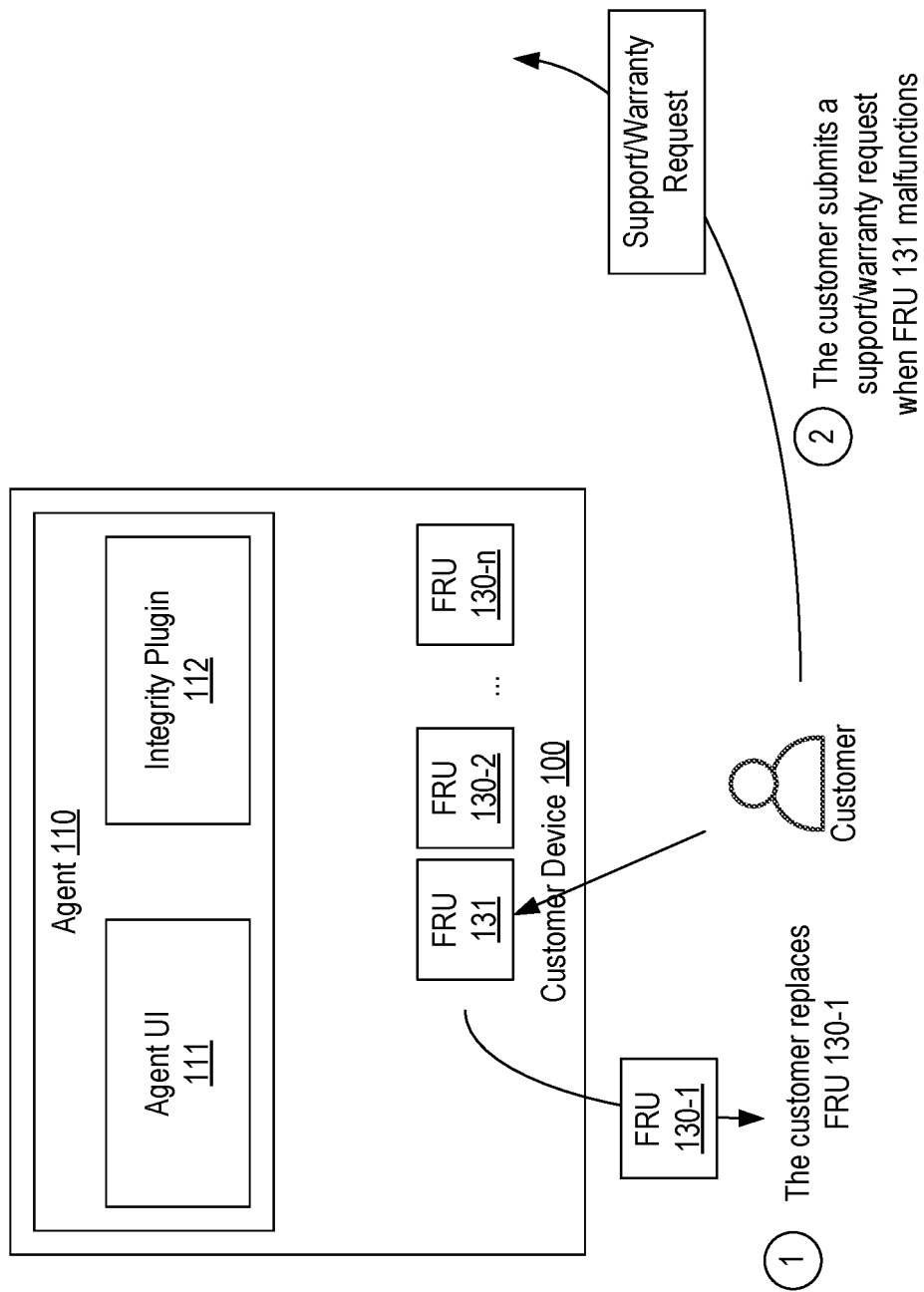
FIGS. 3A-3F provide an example of how a field replaceable unit can be verified before replacement in accordance with one or more embodiments of the present invention.

Turning to FIG. 3A, in step 1, it is assumed that the customer replaced field replaceable unit 130-1 with field replaceable unit 131. For purposes of this example, it is assumed that the field replaceable units 130-1 and 131 are fans. In step 2, it is further assumed that field replaceable unit 131 malfunctions, and in response, the customer submits a service/warranty request (e.g., online, over the phone, etc.) which leads to a technician being sent to replace field replaceable unit 131.

Figure 3B:
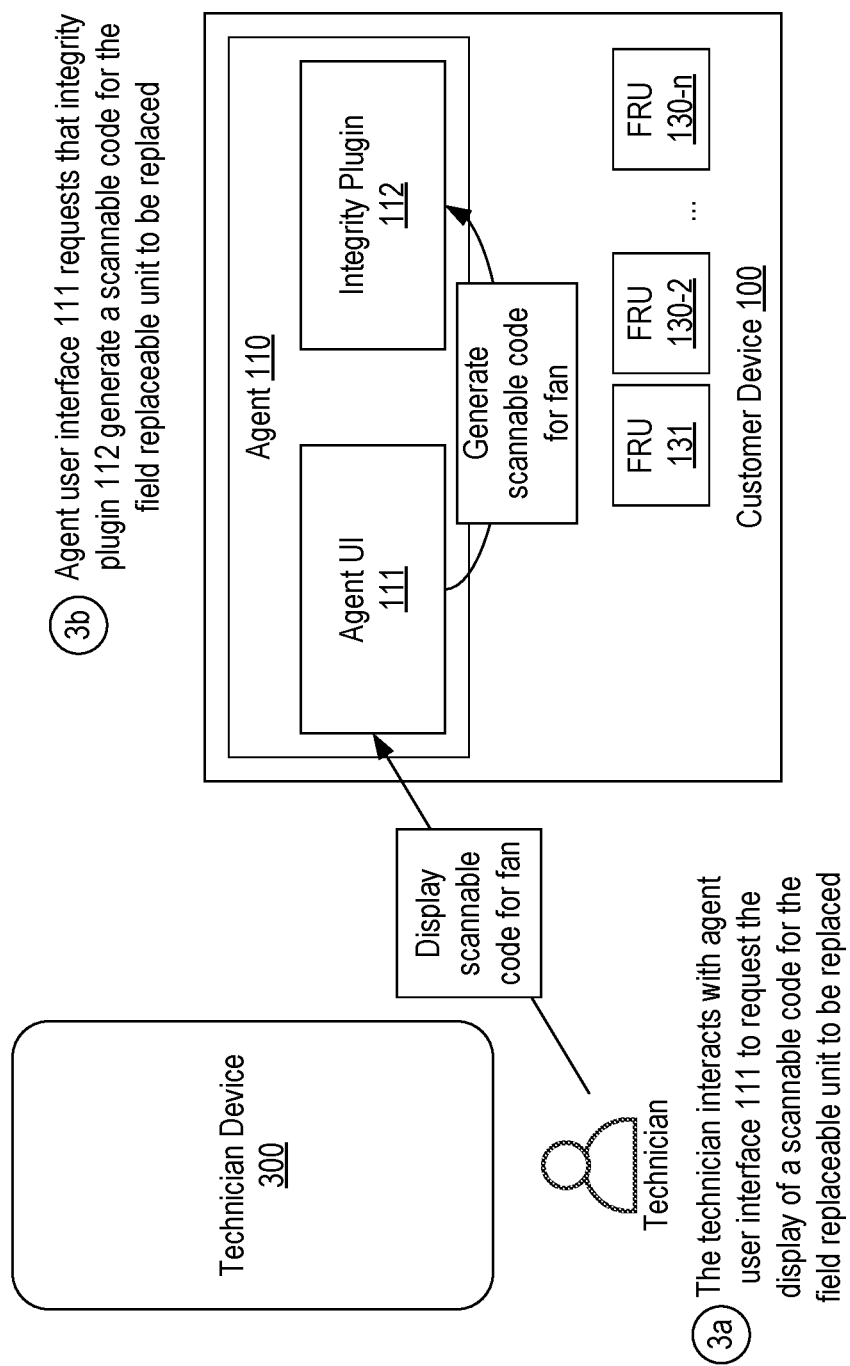

Turning to FIG. 3B, it is now assumed that the technician is at the customer's premises and has accessed customer device 100. In this example, it is assumed that customer device 100 is bootable and therefore agent 110 is running to thereby allow the technician to access agent user interface 111. However, if customer device 100 is not bootable, the technician may be able to access integrity module 121 rather than agent user interface 111 in the steps described below. In step 3a, the technician can interact with agent user interface 111 to request the display of a scannable code for the field replaceable unit to be replaced, which is field replaceable unit 131 in this example. In step 3b, agent user interface 111 can request that integrity plugin 112 generate a scannable code containing the computed hash for the field replaceable unit to be replaced, which again is the fan in this example.

Figure 3C:
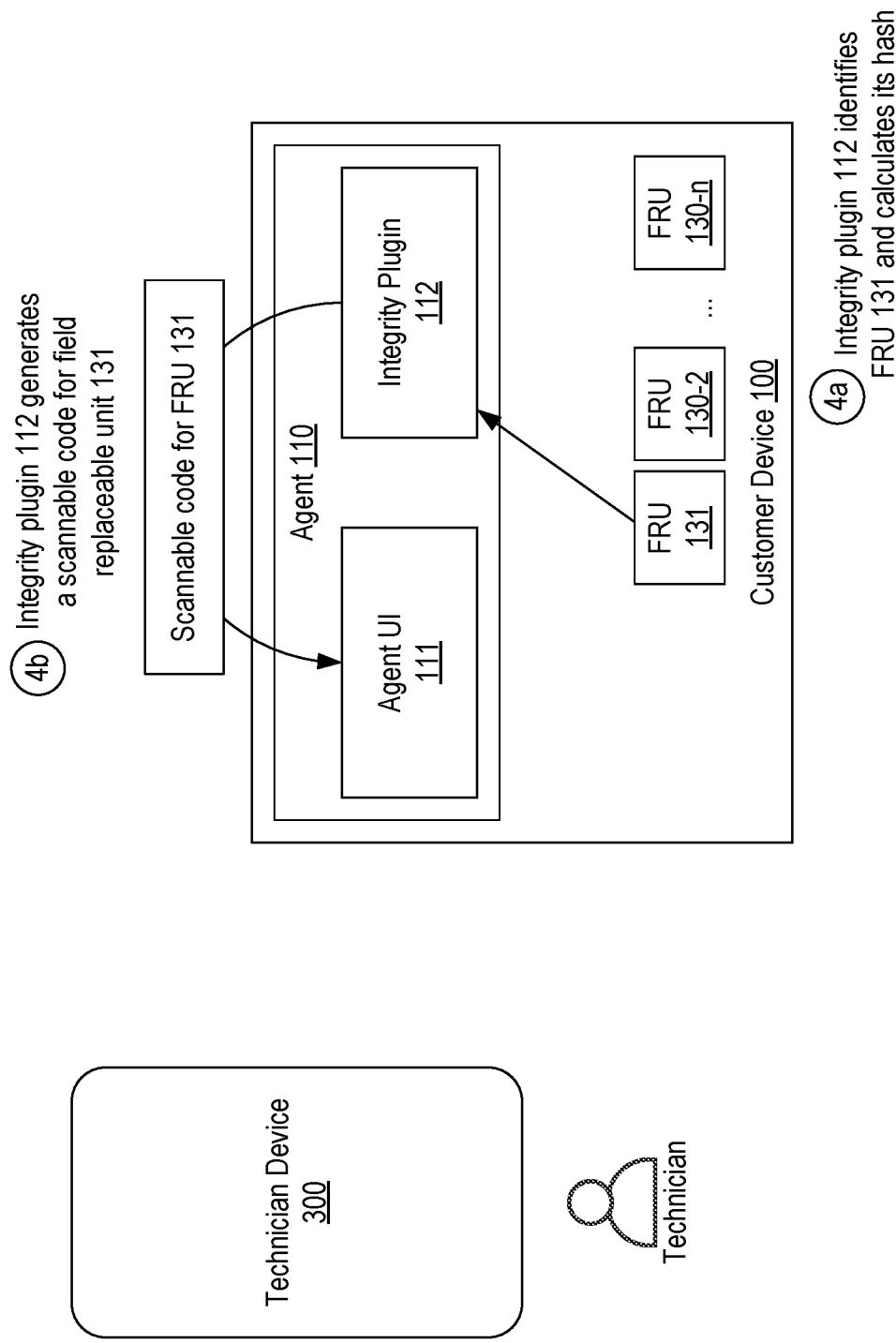

Turning to FIG. 3C, in step 4a, integrity plugin 112 can identify the fan, which is field replaceable unit 131, from among the field replaceable units on customer device 100 and can calculate a hash for it. In step 4b, integrity plugin 112 or agent user interface 111 can generate a scannable code containing the calculated hash. For example, integrity plugin 112 could generate a QR code from the calculated hash and provide the QR code to agent user interface 111 or integrity plugin 112 could provide the calculated hash to agent user interface 111 and agent user interface 111 could generate the QR code.

Figure 3D:
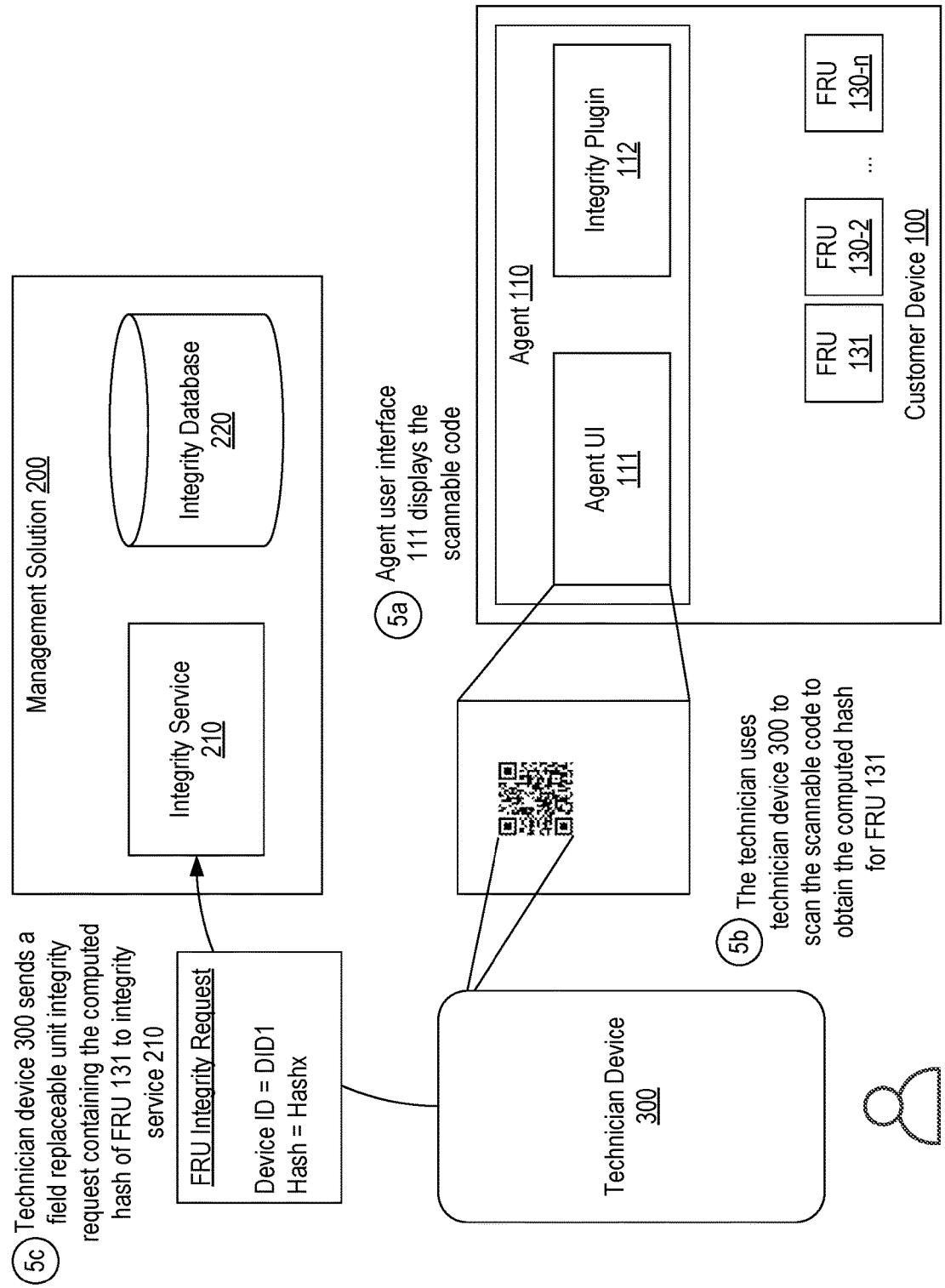

Turning to FIG. 3D, in step 5a, agent user interface 111 can display the scannable code on a display of customer device 100. In step 3D, the technician can use technician device 300 (e.g., a mobile application on technician device 300) to scan the displayed scannable code to thereby obtain the calculated hash for the field replaceable unit that is to be replaced, which is assumed to be Hashx. In step 5c, technician device 300 can send a field replaceable unit integrity request to integrity service 210. This field replaceable unit integrity request can include the computed hash for the field replaceable unit to be replaced which was obtained by scanning the displayed scannable code.

Figure 3E:
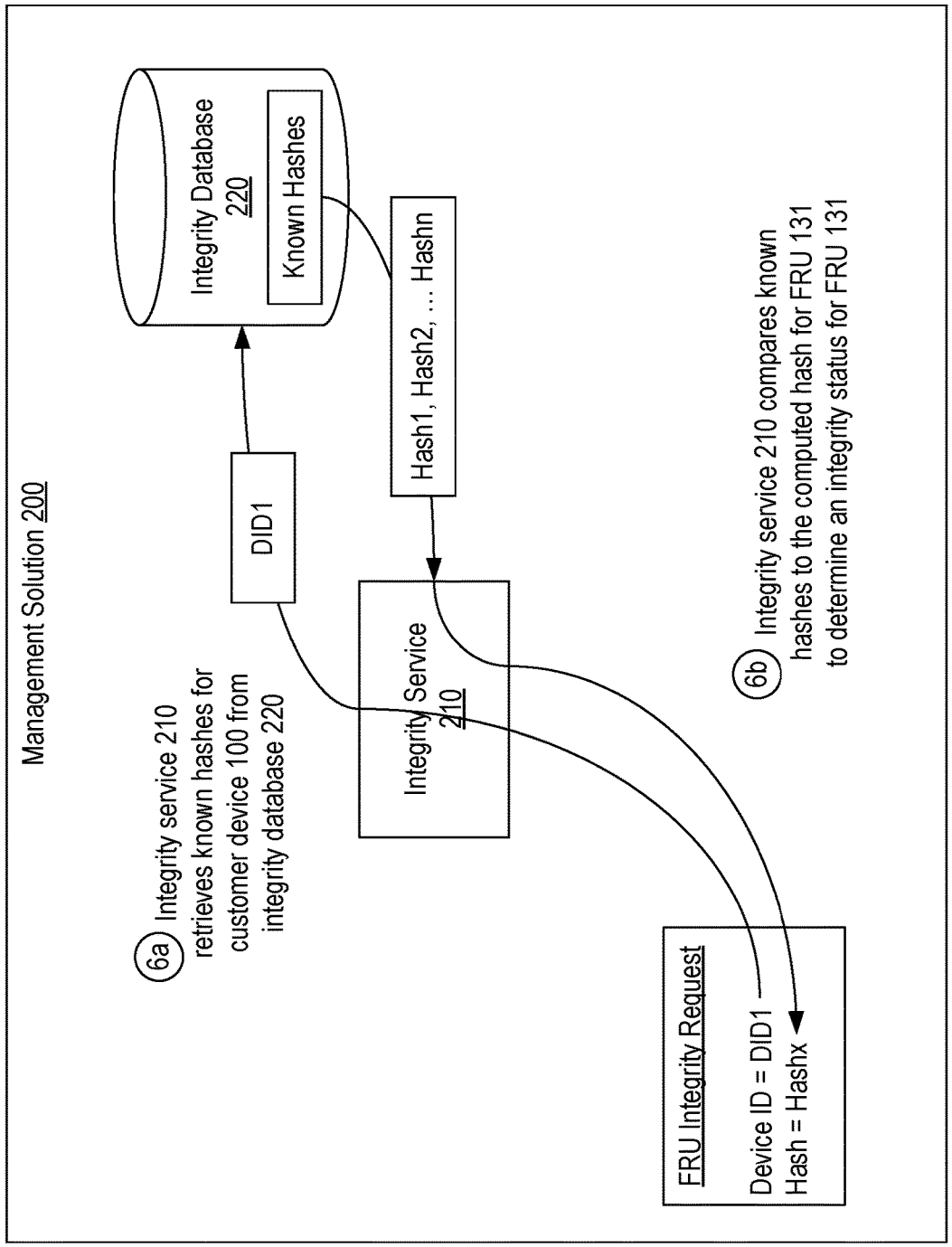

Turning to FIG. 3E, in step 6a and in response to receiving the field replaceable unit integrity request, integrity service 210 can retrieve known hashes for customer device 100 from integrity database 220 (e.g., by using a device ID contained in the field replaceable unit integrity request). In step 6b, integrity service 210 can compare the known hashes for customer device 100 to the computed hash for the field replaceable unit to be replaced to determine an integrity status for the field replaceable unit to be replaced. In this example, the computed hash for field replaceable unit 131 does not match any of the known hashes for field replaceable units of customer device 100 and therefore integrity service 210 can determine that the integrity status for field replaceable unit 131 is "No."

In some embodiments, the field replaceable unit integrity request could identify the type of field replaceable unit to be replaced and integrity service 210 may retrieve known hash(es) for only that type of field replaceable unit from integrity database 220. Also, in some embodiments, integrity service 210 could locate a stored integrity status report for customer device 100 and use it to determine whether the calculated hash matches a known hash.

Figure 3F:
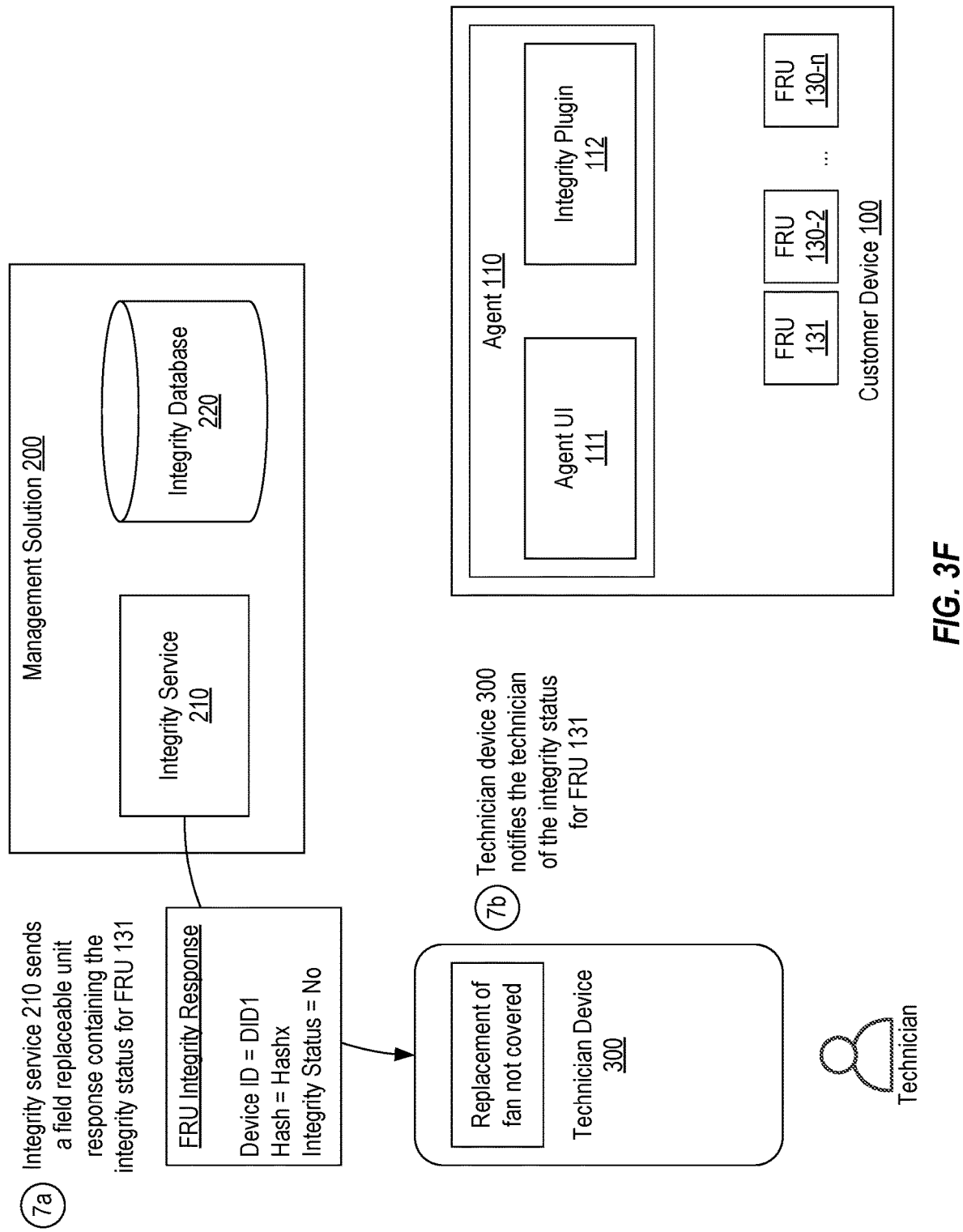

Turning to FIG. 3F, in step 7a, integrity service 210 can send a field replaceable unit response containing the integrity status for field replaceable unit 131 to technician device 300. In step 7b, technician device 300 can notify the technician of the integrity status for field replaceable unit 131. For example, a mobile application on technician device 300 can display a notice that the fan is not covered under a support or warranty plan and is therefore not eligible for replacement. Accordingly, the technician can forego the replacement, at least without charging the customer.

Figure 4A:
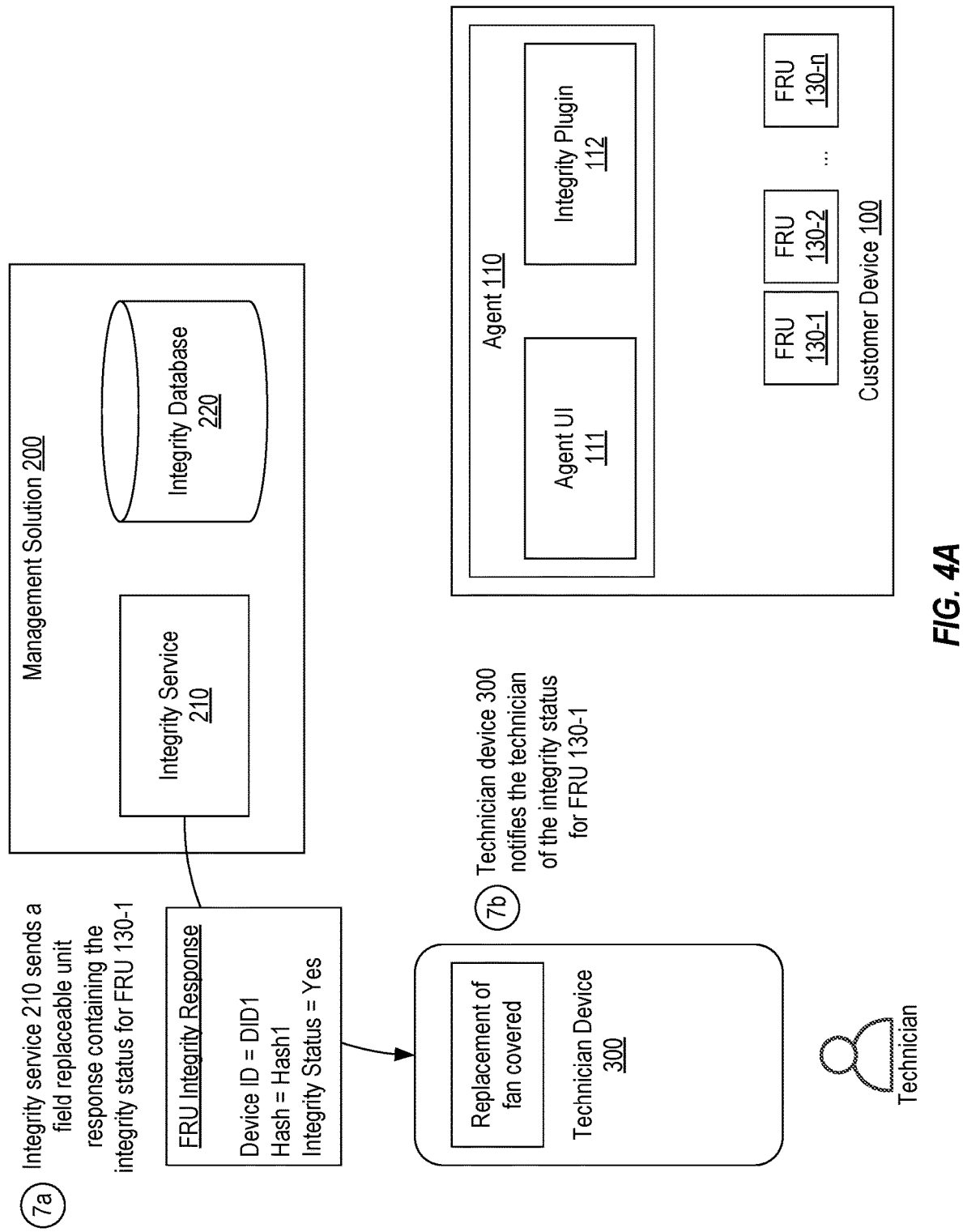
FIG. 4A-4C provide an example of how a new field replaceable unit can be associated with a customer device to enable subsequent verification of the field replaceable unit in accordance with one or more embodiments of the present invention.
Figure 4B:
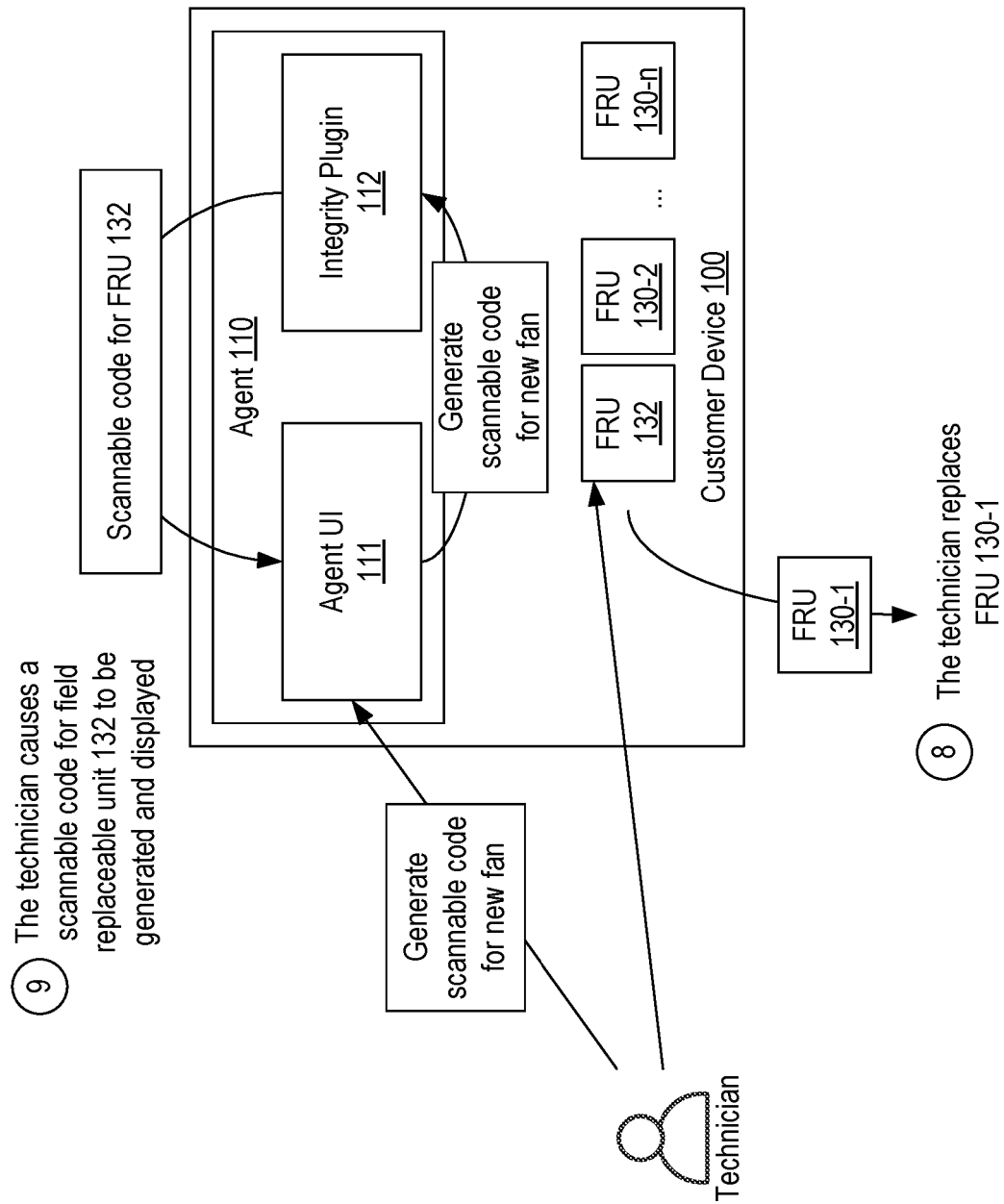
Figure 4C:
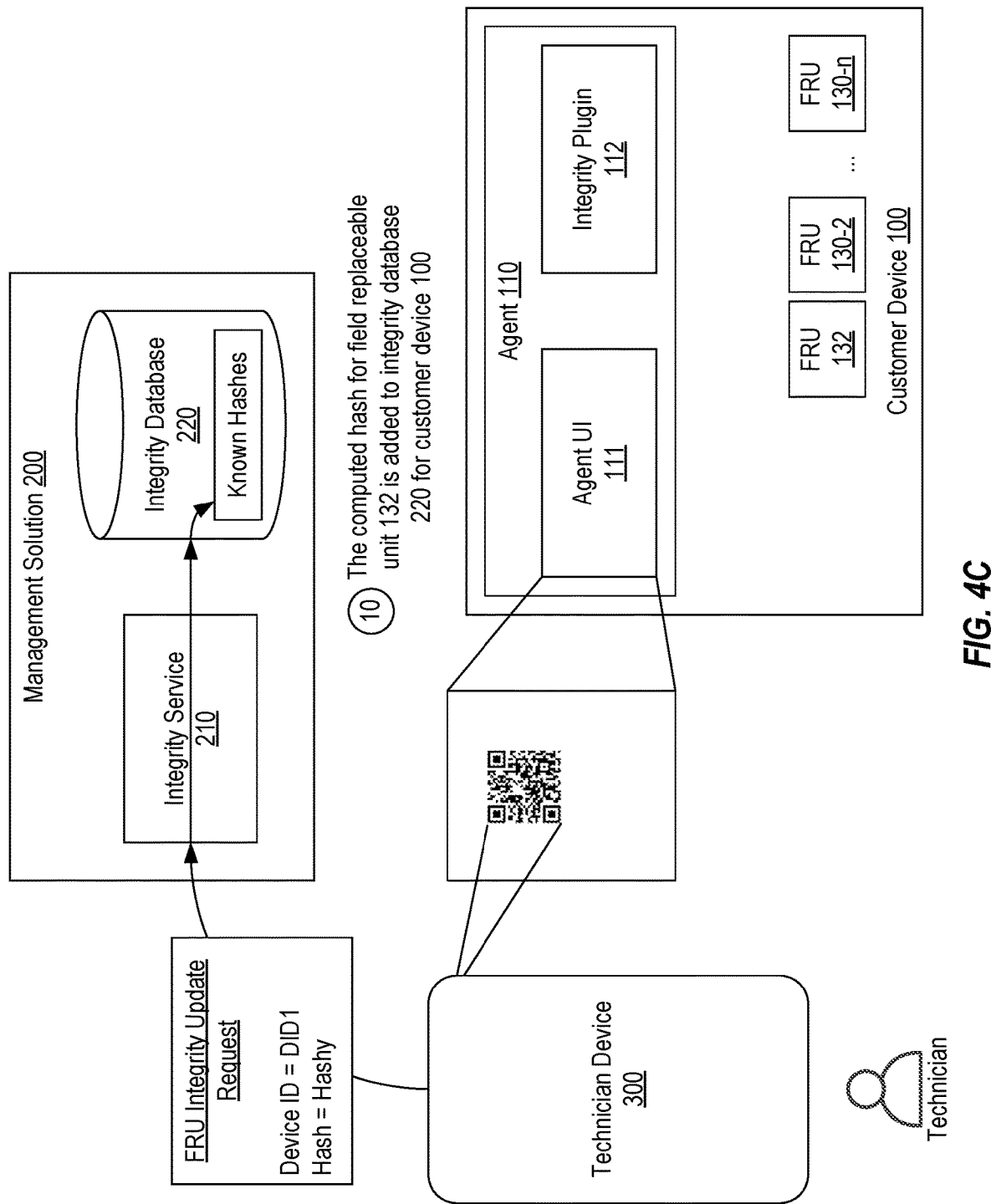

FIGS. 4A-4C provide an example of functionality that can be performed when the field replaceable unit integrity response provides a positive integrity status. In FIG. 4A, steps 7a and 7b are the same as in FIG. 3F except that the field replaceable unit to be replaced is the original fan, field replaceable unit 130-1, and therefore, the integrity status for Hash 1 is "Yes." In this scenario, the technician will be notified that the replacement can proceed.

Turning to FIG. 4B, in step 8, the technician replaces field replaceable unit 130-1 with field replaceable unit 132. In step 9, the technician can interface with agent user interface 111 to cause a scannable code for field replaceable unit 132 to be generated and displayed.

Turning to FIG. 4C, in step 10, the technician can scan the scannable code for field replaceable unit 132 to cause a field replaceable unit integrity update request to be sent to integrity service 210. This field replaceable unit integrity update request can include the computed hash for field replaceable unit 132 which can be added to integrity database 220. In some embodiments, integrity service 210 may also generate a new integrity status report for customer device 100 to reflect the replacement. In this way, the integrity of field replaceable unit 132 can be subsequently verified if it happens to malfunction.

In summary, embodiments of the present invention provide a mechanism for a technician to verify a field replacement unit before replacing it. As a result, an OEM or other provider can minimize improper support or warranty claims including the associated costs.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A network-based method for verifying a field replaceable unit before replacement, the method comprising:
maintaining, by an integrity service that executes on a server-based management solution, an integrity database that defines device identifiers for a plurality of customer devices including a first customer device, the integrity database also defining, for each device identifier, an association between the device identifier and a hash for each field replaceable unit that is known to be installed on the respective customer device;
executing an agent on the first customer device of the customer devices, the agent including a user interface and an integrity plugin;
calculating, by the integrity plugin, a hash for each of a plurality of field replaceable units installed on the first customer device including a hash for a first field replaceable unit;
receiving, by the agent and via the user interface, a request from a technician for display of a scannable code for the first field replaceable unit;
in response to the request, generating, by the integrity plugin, the scannable code from the hash for the first field replaceable unit;
displaying, via the user interface, the scannable code on the first customer device;
in response to the technician using a technician device to scan the scannable code displayed in the user interface on the first customer device, sending, by the technician device, a field replaceable unit integrity request to the integrity service, the field replaceable unit integrity request including the identifier of the first customer device and the hash of the first field replaceable unit;
in response to receiving the field replaceable unit integrity request, determining, by the integrity service, an integrity status of the first field replaceable unit, wherein the integrity service determines the integrity status of the first field replaceable unit by querying the integrity database using the identifier of the first customer device to retrieve the hash for each field replaceable unit that is known to be installed on the first customer device and determining whether the hash of the first field replaceable unit matches the hash for any field replaceable unit that is known to be installed on the first customer device;
sending, by the integrity service, a field replaceable unit integrity response to the technician device, wherein the field replaceable unit integrity response defines a positive integrity status for the first field replaceable unit when the hash of the first field replaceable unit matches the hash for any field replaceable unit that is known to be installed on the first customer device, wherein the field replaceable unit integrity response defines a negative integrity status for the first field replaceable unit when the hash of the first field replaceable unit does not match the hash for any field replaceable unit that is known to be installed on the first customer device; and
displaying, on the technician device, the field replaceable unit integrity response.

2. The method of claim 1, wherein the hash for each field replaceable unit is calculated from one or more identifiers of the field replaceable unit.

3. The method of claim 1, further comprising:
after the first field replaceable unit has been replaced with a second field replaceable unit, calculating a hash of the second field replaceable unit;
generating a second scannable code from the hash of the second field replaceable unit;

displaying the second scannable code in the user interface on the first customer device;

in response to the technician using the technician device to scan the second scannable code on the first customer device, sending a field replaceable unit update request to the integrity service, the field replaceable unit update request including the hash of the second field replaceable unit; and in response to receiving the field replaceable unit update request, storing the hash of the second field replaceable unit in association with the identifier of the first customer device in the integrity database.

4. The method of claim 1, wherein the scannable code is displayed on the first customer device by a UEFI/BIOS integrity module when the first customer device is not bootable.

5. One or more computer storage media storing computer executable instructions which when executed implement a network-based method for verifying a field replaceable unit before replacement, the method comprising:

maintaining, by an integrity service that executes on a server-based management solution, an integrity database that defines device identifiers for a plurality of customer devices including a first customer device, the integrity database also defining, for each device identifier, an association between the device identifier and a hash for each field replaceable unit that is known to be installed on the respective customer device;

executing an agent on the first customer device of the customer devices, the agent including a user interface and an integrity plugin;

calculating, by the integrity plugin, a hash for each of a plurality of field replaceable units installed on the first customer device including a hash for a first field replaceable unit;

receiving, by the agent and via the user interface, a request from a technician for display of a scannable code for the first field replaceable unit;

in response to the request, generating, by the integrity plugin, the scannable code from the hash for the first field replaceable unit;

displaying, via the user interface, the scannable code on the first customer device;

in response to a technician using the technician device to scan the scannable code displayed in the user interface on the first customer device, sending, by the technician device, a field replaceable unit integrity request to the integrity service, the field replaceable unit integrity request including the identifier of the first customer device and the hash of the first field replaceable unit;

in response to receiving the field replaceable unit integrity request, determining, by the integrity service, an integrity status of the first field replaceable unit, wherein the integrity service determines the integrity status of the first field replaceable unit by querying the integrity database using the identifier of the first customer device to retrieve the hash for each field replaceable unit that is known to be installed on the first customer device and determining whether the hash of the first field replaceable unit matches the hash for any field replaceable unit that is known to be installed on the first customer device;

sending, by the integrity service, a field replaceable unit integrity response to the technician device, wherein the field replaceable unit integrity response defines a positive integrity status for the first field replaceable unit when the hash of the first field replaceable unit matches the hash for any field replaceable unit that is known to be installed on the first customer device, wherein the field replaceable unit integrity response defines a negative integrity status for the first field replaceable unit when the hash of the first field replaceable unit does not match the hash for any field replaceable unit that is known to be installed on the first customer device; and displaying, on the technician device, the field replaceable unit integrity response.

6. The computer storage media of claim 5, wherein the method further comprises:

when the field replaceable unit integrity response defines a negative integrity status for the first field replaceable unit, notifying a technician to forego replacing the first field replaceable unit.

7. The computer storage media of claim 5, wherein the method further comprises:

after the first field replaceable unit has been replaced with a second field replaceable unit, calculating a hash of the second field replaceable unit;

generating a second scannable code from the hash of the second field replaceable unit;

displaying the second scannable code in the user interface on the first customer device;

in response to the technician using the technician device to scan the second scannable code on the first customer device, sending a field replaceable unit update request to the integrity service, the field replaceable unit update request including the hash of the second field replaceable unit; and in response to receiving the field replaceable unit update request, storing the hash of the second field replaceable unit in association with the identifier of the first customer device in the integrity database.

8. The computer storage media of claim 5, wherein the scannable code is displayed by a UEFI/BIOS module when the first customer device is not bootable.

9. A system comprising:

a plurality of customer devices each having field replaceable units and an agent that includes an agent user interface and an integrity plugin, the plurality of customer devices including a first customer device;

a management solution that includes an integrity service and an integrity database; and a technician device;

wherein the agent, the management solution and the technician device are configured to perform a method for verifying a field replaceable unit before replacement, the method comprising:

maintaining, by the integrity service, the integrity database that defines device identifiers for the plurality of customer devices, the integrity database also defining, for each device identifier, an association between the device identifier and a hash for each field replaceable unit that is known to be installed on the respective customer device;

executing the agent on the first customer device;

calculating, by the integrity plugin, a hash for each of a plurality of field replaceable units installed on the first customer device including a hash for a first field replaceable unit;

receiving, by the agent and via the user interface, a request from a technician for display of a scannable code for the first field replaceable unit that is installed on the first customer device;

in response to the request, generating, by the integrity plugin, the scannable code from the hash for the first field replaceable unit;

displaying, via the user interface, the scannable code on the first customer device;

in response to the technician using the technician device to scan the scannable code displayed in the user interface on the first customer device, sending, by the technician device, a field replaceable unit integrity request to the integrity service, the field replaceable unit integrity request including the identifier of the first customer device and the hash of the first field replaceable unit;

in response to receiving the field replaceable unit integrity request, determining, by the integrity service, an integrity status of the first field replaceable unit, wherein the integrity service determines the integrity status of the first field replaceable unit by querying the integrity database using the identifier of the first customer device to retrieve the hash for each field replaceable unit that is known to be installed on the first customer device and determining whether the hash of the first field replaceable unit matches the hash for any field replaceable unit that is known to be installed on the first customer device;

sending, by the integrity service, a field replaceable unit integrity response to the technician device, wherein the field replaceable unit integrity response defines a positive integrity status for the first field replaceable unit when the hash of the first field replaceable unit matches the hash for any field replaceable unit that is known to be installed on the first customer device, wherein the field replaceable unit integrity response defines a negative integrity status for the first field replaceable unit when the hash of the first field replaceable unit does not match the hash for any field replaceable unit that is known to be installed on the first customer device; and displaying, on the technician device, the field replaceable unit integrity response.

10. The system of claim 9, wherein the first customer device also includes a UEFI/BIOS integrity module that is configured to present the scannable code.

11. The system of claim 9, wherein the method further comprises:

after the first field replaceable unit has been replaced with a second field replaceable unit, calculating a hash of the second field replaceable unit;

generating a second scannable code from the hash of the second field replaceable unit;

displaying the second scannable code in the user interface on the first customer device;

in response to the technician using the technician device to scan the second scannable code on the first customer device, sending a field replaceable unit update request to the integrity service, the field replaceable unit update request including the hash of the second field replaceable unit; and in response to receiving the field replaceable unit update request, storing the hash of the second field replaceable unit in association with the identifier of the first customer device in the integrity database.

* * * * *